Feb. 27, 1968    J. D. FROST    3,370,886
ENERGY ABSORBING CUSHION
Filed March 4, 1966    3 Sheets-Sheet 1

JAMES D. FROST
INVENTOR

Huebner & Worrel
ATTORNEYS

Feb. 27, 1968   J. D. FROST   3,370,886
ENERGY ABSORBING CUSHION
Filed March 4, 1966   3 Sheets-Sheet 2

JAMES D. FROST
INVENTOR

Huebner + Worrel
ATTORNEYS

Feb. 27, 1968 J. D. FROST 3,370,886
ENERGY ABSORBING CUSHION
Filed March 4, 1966 3 Sheets-Sheet 3

JAMES D. FROST
INVENTOR

Huebner & Worrel
ATTORNEYS

United States Patent Office								3,370,886
																Patented Feb. 27, 1968

3,370,886
ENERGY ABSORBING CUSHION
James Dahle Frost, P.O. Box 775,
Porterville, Calif. 93257
Continuation-in-part of application Ser. No. 406,656,
Oct. 19, 1964, now Patent No. 3,250,065. This application Mar. 4, 1966, Ser. No. 531,663
10 Claims. (Cl. 297—384)

ABSTRACT OF THE DISCLOSURE

An energy absorbing cushion for use in vehicles positioned to absorb the kinetic energy of rapidly decelerated passengers and other vehicular contents characterized by the provision of a flexible pneumatic envelope having an outlet and means for supplying air to the envelope at a rate sufficient to maintain a positive pressure therein to distend the envelope while continuously discharging air through the outlet.

RELATED APPLICATION

This application is a continuation-in-part of parent application Ser. No. 406,656, filed Oct. 19, 1964 which issued as United States Patent No. 3,250,065 on May 10, 1966 and in which there was a requirement for an election of species, this application relating to the species of FIGURES 20, 21 and 22 of said parent application.

BACKGROUND

The high rate of injuries and property damage resulting from vehicular accidents is well known. A substantial percentage of such injuries or damage results from cargoes or passengers making violent contact with the interior rigid surfaces of their vehicles when sudden stops occur as a result of impacts against stationary objects or other vehicles. Although seat belts have become widely used for passengers of many types of vehicles, and cargoes are almost always lashed to their transport vehicles, such belts or lashings sometimes break and release their burdens so as to cause great harm. Frequently, in the case of passengers, a seat belt will restrain only a portion of the body, allowing other portions, such as the head and torso, to make violent crushing contact with a steering wheel, dashboard, back of a seat, or the like. Furthermore, although seat belts are often quite successful in restraining portions of a passenger's body from movement due to their rigid connection to the vehicle, the very nature of such unyielding connection leads to the forceful sudden compression of restrained portions of the body so that in a vehicle accident the passenger's body is often severely contused or bruised.

Solid, rigid surfaces in vehicles have previously been padded so as to cushion passengers and cargoes from forceful impacts with such surfaces but conventional padding has not proved entirely effective in preventing injury or damage. Such padding is not sufficiently soft to absorb an adequate extent of the kinetic energy to be effective against the sudden tremendously forceful impacts characteristic of modern high-speed vehicles and from which most serious injuries occur. To render conventional cushions more nearly effective, extremely bulky padding is necessary, which is impracticable due to space limitations. Further, some such padding is too resilient and returns an appreciable amount of the energy received so as to defeat its purpose. For example, the use of conventional inflated pneumatic cushions for softening impact requires more space than is normally available and, even when such cushions are used, they do not ensure adequate absorption of kinetic energy developed by a moving object or body, with the result that such cushions tend to deflect objects and cause them to recoil or bounce upon impact. Obviously, conventional cushioning or padding cannot be used for the covering of windshields or window panes, with which passengers often come into violent and harmful contact during accidents.

SUMMARY

The present invention provides an energy absorbing cushion which is contractible and extensible having an opening for the continuous discharge of air therefrom, and means for supplying air thereto at a rate sufficient to maintain a positive pressure in the cushion. Thus, the energy of impacts against the cushion is immediately dissipated by displacement of air therefrom without the rebound characteristic of confined air or the delay incident to operation of relief valves for air release.

Accordingly, it is an object of the present invention to provide an improved energy absorbing cushion.

Another object is to provide an energy absorbing cushion adapted for use in a moving vehicle to absorb kinetic energy of objects or bodies supported in the vehicle and subjected to relative motion therebetween.

Another object is to provide such a cushion which is usable in any type of vehicle, such as an automobile, bus, train, aircraft, or spacecraft.

Another object is to provide such a cushion adapted to absorb the kinetic energy of a moving body carried in a vehicle regardless of the direction of movement of the body relative to the vehicle at impact.

Another object is to provide such a cushion of a pneumatic type wherein the quantity of air is automatically regulated so as to absorb impact forces thereagainst, by air displacement.

Another object is to provide such a cushion which is deflatable for periods of non-use and inflatable prior to periods of possible impact so as to allow economy of space.

Another object is to provide such a cushion which is usable in combination with a retractable steering wheel in a vehicle so as to prevent injury to the face, head and upper body of a vehicle operator.

Another object is to provide such a cushion which absorbs the kinetic energy of a moving body upon impact with a vehicle windshield or the like.

Another object is to provide such a cushion which provides firm support for a seat belt while yielding sufficiently on impact to prevent contusion or bruising of portions of a passenger's body restrained by the belt.

Another object is to provide such a cushion adapted to be mounted on exterior portions of a vehicle for cushioning the impact of objects or bodies externally thereof.

Another object is to provide a cushion of the character described which minimizes or obviates rebounding.

Another object is to provide a cushion of the character described which is of simple, strong, and durable construction, and is adapted to be manufactured at low cost.

These and other objects and advantages of the present invention will become more clearly apparent upon reference to the following description and accompanying drawings.

FIRST FORM

Figure 1:
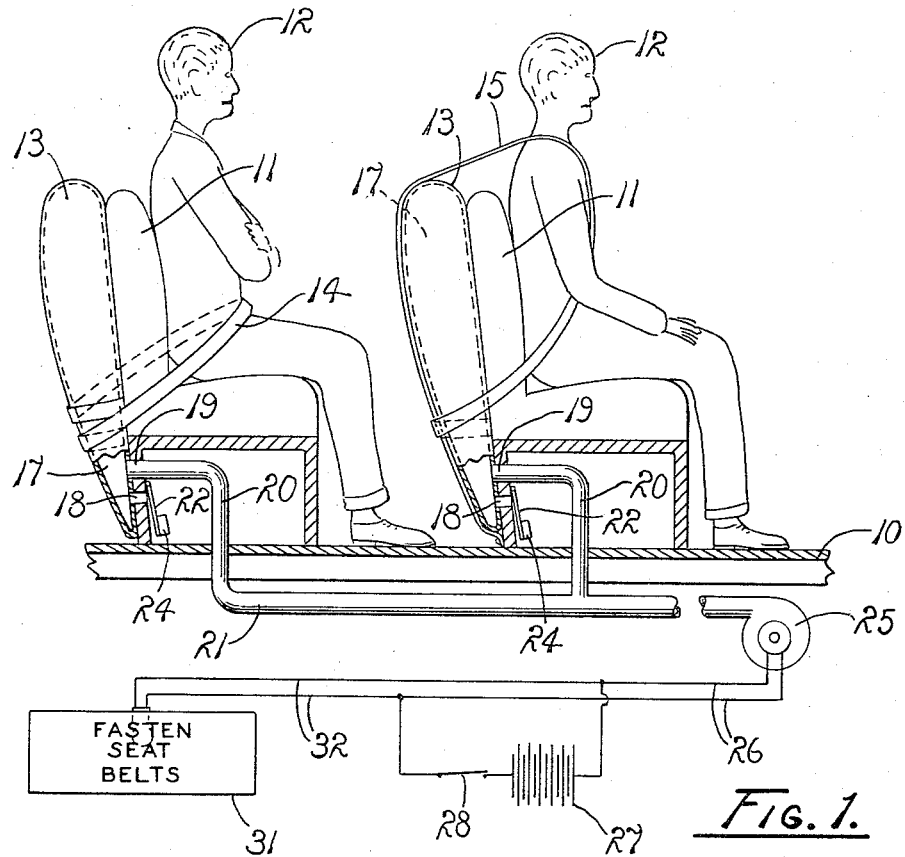
FIG. 1 is a fragmentary longitudinal vertical section of a vehicle equipped with energy absorbing cushions of the present invention with certain associated apparatus being schematically represented.

Referring more particularly to the drawings, a vehicle is fragmentarily illustrated as including a frame 10 to which are affixed a pair of spaced passenger seats 11. The vehicle is intended for normal travel in a direction from left to right, as viewed in FIG. 1, and is shown with occupants or passengers 12 in respective seats. The seats may be visualized as two of a long series as employed in buses, trains and aircraft. If desired, the passengers may be secured to their seats either by a seat belt 14 or by a pair of shoulder straps 15 extending across the torso and over the shoulders.

On the back of each seat 11, a flexible membrane or envelope 13 representing a first form of the present invention is secured providing an air receiving chamber 17 and forming a cushion when inflated. The seat belt 14 and shoulder straps 15 are preferably extended about the corresponding cushions in substantially taut engagement therewith. The envelope is formed of any suitable elastomeric or substantially fluid-tight material, such as sheet plastic or rubber. The envelope is provided with a constricted orifice or outlet 18, and an inlet 19 connected to a supply conduit 20 leading preferably through a manifold duct 21 to allow centralized air supply to a plurality of envelopes. A flap 22 is preferably hingedly connected across the outlet and is adapted to swing outwardly from the outlet to accommodate increased discharge of air therethrough. A weight 24 of selected weight may be provided on the flap so as gravitationally to urge it toward the outlet and thereby to restrict air discharged therethrough to a predetermined rate proportionate to the rate of supply. When employed, the weight is preferably disposed so that upon sudden stopping of the vehicle in the manner likely to project the passenger into the envelope 13, the inertia of the weight tends to move the flap outwardly from the orifice to accommodate increased air discharge therethrough.

The manifold duct 21 leads to a suitable source of air under pressure, such as a blower or air compressor 25 mounted in the vehicle. The blower may be any suitable type adapted to provide a predetermined supply of air to the chamber 17 which is sufficient to absorb the kinetic energy of a passenger 12 thrown into sudden contact with the envelope 13. In the described embodiment, the blower is preferably electrically energizable and is connected by conductors 26 to a source of electrical energy, such as a battery 27. A switch 28 is provided for selective activation of the blower circuit.

Although it is possible to energize the blower circuit and maintain the envelope 13 continually in inflated or distended condition, it is in some environments preferable that the envelope be maintained most of the time in a collapsed or deflated condition so as to economize on space. It is then only necessary to activate the blower 25 so as to distend the envelope prior to anticipated periods of possible impact, such as before take-off, landing, and/ or turbulent-air flying of aircraft, or during mountain travel by buses, trains, and automobiles, or at any other time during which accidents are likely to occur. For this purpose, the blower circuit may be conveniently connected in parallel with another periodically energized system in the vehicle, such as an illuminable "Fasten Seat Belts" sign 31 in an aircraft. Conductors 32 may be used for this connection.

It should be appreciated that the mounting of the cushion or envelope 13 of the first form of the present invention, as shown in FIG. 1, is merely an example of the various possible locations of such a cushion in a vehicle. It is also possible to mount the cushion on a wall, dashboard, or on other obstructions or surfaces constituting a hazard in the event of sudden stopping.

Figure 2:
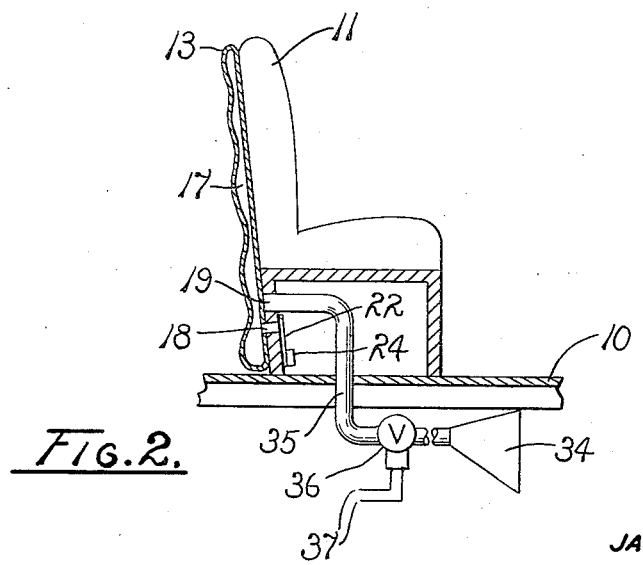
FIG. 2 is a fragmentary view similar to FIG. 1 but showing the cushion thereof in deflated condition and illustrating a second type of inflation system.

A second type of air supply means adapted to be used with the present invention is shown generally in FIG. 2, in operable association with an energy absorbing cushion consisting of the same structural elements described above. These structural elements are numbered similarly in both figures. The second type is representative of other suitable fluid supply systems and utilizes an externally disposed air scoop 34 substituted for the air blower 25 of FIG. 1, thus providing an air supply especially well adapted for use in high-speed vehicles, such as modern aircraft. Depending upon the supply of air required, a scoop may be provided for each envelope 13 or for a predetermined number of envelopes, as desired. The scoop is connected through a duct 35 to the inlet 19 of the chamber 17 and is preferably provided with an electrically actuated valve 36 by which the duct passageway may be selectively opened or shut. The valve is connected through leads 37 to a source of electrical energy similar to that illustrated in FIG. 1, such as a battery, not shown, and may be connected to a related system such as a "Fasten Seat Belts" sign, as described above for the first type of air supply system. The air scoop is suitably oriented at a location on the exterior of the aircraft to allow free and unrestricted air intake at adequate flow rates.

OPERATION OF FIRST FORM

The operation of the first form of the present invention is believed to be readily apparent and is briefly summarized at this point. Assuming that the vehicle 10 is an airplane and a passenger 12 is seated therein ready for take-off, the "Fasten Seat Belts" sign 31 is first illuminated by closing the switch 28, thereby also completing the circuit leading to the air blower 25. This causes the blower to supply air under pressure to the chamber 17 so as to distend the cushion or envelope 13 until it has been inflated to the desired pressure, at which time the air commences to exhaust through the outlet 18 at a predetermined rate controlled by the gravitational bias of the flap 22. The flap acts as a control for the orifice, which functions as a continuously discharging relief valve. The cushion is maintained in this inflated condition until the end of the emergency or cautionary period during and after take-off. The inflating pressure maintained is only a slight positive pressure, a few pounds per square inch above ambient pressures being adequate for the purpose.

If a mishap occurs during the emergency period and the plane is caused to crash, to make an emergency landing or otherwise come to a sudden stop, the passenger who is restrained only by the seat belt 14 around his midsection is thrown forwardly relative to the airplane. As has proved to be the case in many accidents, such a passenger most likely strikes a point of impact at the rear of seat 11, where he hits the inflated envelope 13. The energy of impact causes air to be forcefully discharged through the orifice 18 so that, except at the moment of impact, the internal pressure in the envelope is not substantially raised and there is virtually no bounce or energy return. When the impact of the passenger against the envelope is violent, the expelling air forces the flap 22 outwardly so that the orifice can accommodate large volume release of air. The result is that the envelope absorbs the kinetic energy of the passenger's body and thereby prevents the passenger from striking the rigid back of the seat while at the same time causing a dampening effect in the cushion as a result of the discharge of air at a limited rate through the constricted orifice 18. This dampening effect allows the passenger to sink into the cushion while preventing the cushion from resiliently bouncing the passenger back so as to subject him to internal injury or the like as a result of back-lash or other violent contortion.

Immediately after any such impact, the air within the chamber 17 is replenished by the blower 25 so as to recondition the envelope 13 for subsequent impacts, if necessary. The prompt reinflation is facilitated by the return of the flap 22 under the urging of the weight 24. It is to be noted that even with the flap closed, there nevertheless is a continuous discharge of air through the orifice 18 so that upon further impact, the release of excess air due to pressure exerted on the envelope is immediately initiated and does not require flap movement to commence.

In contrast to a passenger who is restrained only by a seat belt around his mid-section, a passenger having shoulder straps is substantially restrained from forward movement relative to the airplane. Nevertheless, both such passengers are forcefully compressed against their belts or straps during accidents and, in the case of conventional belts, have been known frequently to suffer contusions or bruises therefrom. However, disposition of the shoulder straps 15 or seat belt 14 across the cushions 13 of the present invention allows them momentarily to yield to the sudden pressure caused by the passenger's momentum. In allowing such yielding, the cushion or inflated envelope functions in substantially the same manner as described above with regards to direct impact by a passenger and thereby minimizes such contusions or bruises.

After the cautionary period during take-off has passed and no accident, or sudden deceleration or change of impetus has occurred, the plane assumes a normal course of flight and the "Fasten Seat Belts" sign 31 is turned off by opening the switch 28. This also deactivates the blower 25 and allows the envelopes 13 automatically and immediately to deflate by discharge of air from the chamber 17 through the orifice 18. As a result, the passengers 12 are allowed increased leg room for comfort and convenience during travel and are not obstructed by distended surfaces of the cushion, which would otherwise be the case if it were to retain its inflated condition throughout the trip. The continuous automatic discharge of air through the orifice provides for the deflation of the envelope upon deactivation of the blower without reacquiring additional valving or manipulation by hand, as would be necessary with conventional air-tight pneumatic cushions. Furthermore, the common manifolding of all the cushions in a vehicle to the common source of air supply or blower 25, through the duct 21, allows their immediate simultaneous inflation upon a signal from a centralized circuit, rather than requiring the inconvenient and tedious inflation of each envelope, one by one.

Operation of the first form of the present invention in conjunction with the second type of air supply is substantially similar to its operation with the first type of air supply. During the cautionary period described above, the valve 36 is activated by closing the switch 28 so as to open the supply duct 35 leading from the air scoop 34 to the envelope 13. Then, as the aircraft attains a sufficiently high speed either on the ground or in the air, air flows under pressure through the duct to inflate the envelope in a manner similar to inflation of the envelope by the blower 25 and to maintain a slight positive pressure in the envelope even through air is continuously discharged through the orifice. The envelope, while so inflated, serves a similar purpose and function as described above and, at the end of the emergency or cautionary period, may be deflated by opening the switch 28, thus closing the valve 36 and shutting off the air supply.

As will, of course, be evident to those skilled in the art, the energy absorbed by the cushions 13 may also be dissipated back through the blower 25. In other words, the orifices 18 may be closed or omitted and a low pressure blower employed at 25 backwardly through which air can be forced even during blower operation by impact on the envelopes. In such event, the blower still constitutes an air supply means and the conduit 20, or any other similar contiuous opening, a constricted outlet for the envelopes.

SECOND FORM

Figure 3:
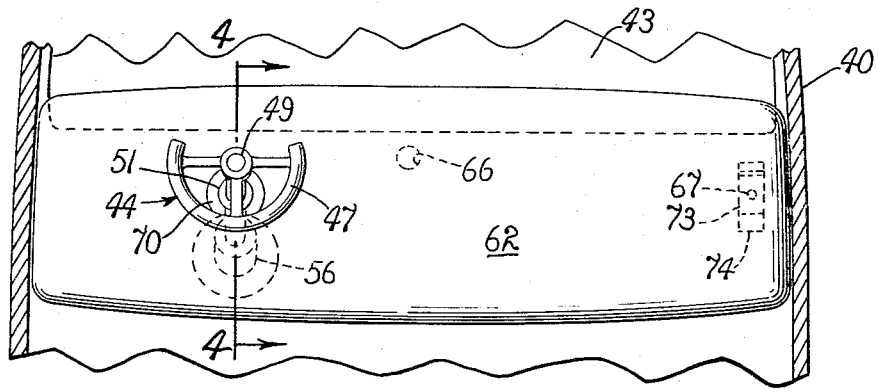
FIG. 3 is a fragmentary transverse vertical section of a vehicle equipped with a second form of energy absorbing cushion of the present invention.
Figure 4:
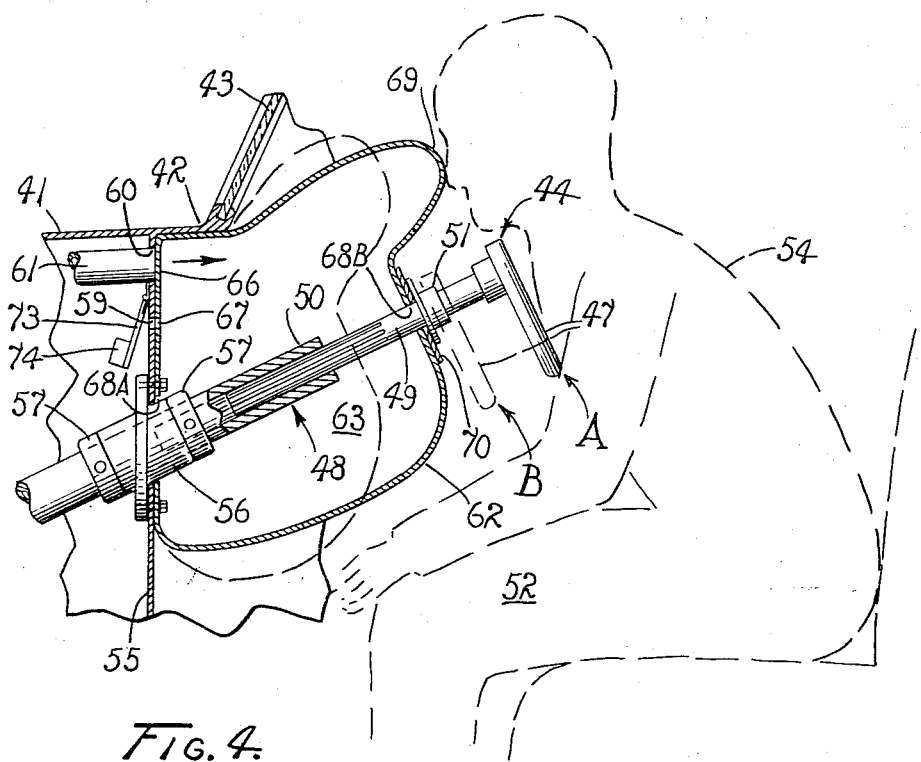
FIG. 4 is an enlarged fragmentary longitudinal vertical section of the vehicle of FIG. 1 taken in a plane represented by line 4—4 of FIG. 3 and showing a vehicle operator.

A second form of energy absorbing cushion of the present invention is shown generally in FIGS. 3 and 4. A motor vehicle is fragmentarily illustrated as including a frame 40 supporting a hood 41, and a cowl 42 on which is mounted a windshield 43. A suitable steering gear 44 is provided for the vehicle and includes a grip portion or wheel 47 mounted on an elongated telescopic steering column 48. The column consists of an extension shaft 49 slidably splined to a main shaft 50 which extends to a steering linkage, not shown. A collar 51 is connected to the extension shaft at a predetermined fixed distance from the steering wheel, for purposes soon to become apparent. The steering wheel is disposed in the passenger compartment 52 of the vehicle, in which an occupant or operator 54 is seated. The splined engagement of the extension shaft with the main shaft allows the extension shaft to be selectively extended or retracted for convenience of use by the vehicle operator. The main shaft of the steering wheel extends through a wall 55 of the compartment and is supported by means of a flanged bearing housing 56 bolted to the wall. Retaining collars 57 are pinned or screwed to the main shaft to maintain the shaft's proper position relative to the bearing. The wall provides a constricted orifice 59 and an opening 60 on which is supported an air supply conduit 61 leading to a source of air under pressure, such as those described for the first form.

A flexible membrane or envelope 62 is secured to the interior of the compartment wall 55 and provides an air receiving chamber 63 forming a cushion when inflated. The envelope is formed of a material similar to that of the first form and includes an inlet opening 66 disposed in registry with the air supply conduit 61 and a constricted orifice or outlet 67 disposed in registry with the orifice 59 in the wall.

Suitable openings, spaces or gaps may be provided as necessary to allow the convenient viewing of the vehicle instruments, not shown. The envelope 62 provides openings 68A and 68B for accommodation of the steering column 48. The upper portion of the envelope when inflated provides an enlarged projecting surface 69 disposed in a position most likely to receive the head of the vehicle operator 54 in the event of a sudden stop, as shown in FIG. 4. An annular bearing plate 70 is preferably secured to the exterior of the envelope around the opening 68B therein and is disposed in substantially pneumatically sealed slidable engagement with the extension shaft, while also providing a seat for the collar 51 of the extension shaft 49.

The envelope 62 may be extended the entire breadth of the vehicle, as shown in FIG. 3, or two or more envelopes may be utilized extending in series along the compartment wall 55 or along a dashboard, not shown. In the latter case the envelopes disposed apart from the steering gear 44 are substantially similar to the envelopes 13 of the first form.

A flap 73 is preferably hingedly connected across the outlet 59 and a weight 74 of selected amount may be provided on the flap so as gravitationally to urge it towards the outlet. The disposition and function of the flap and its weight are substantially similar to that described above for the flap 21 and weight 24 of the first form. Also, as described in connection with the first form, the air supply system may be energized either manually or automatically and, although for convenience of description the envelope or cushion is shown in an inflated condition, it may be maintained in a deflated condition during periods of non-use.

OPERATION OF SECOND FORM

The operation of the second form of the present invention is also believed to be readily apparent and is briefly summarized. During normal travel along a highway, air is supplied to the envelope 62 so as to maintain it in inflated condition while continuously discharging air through the orifice 67. A slight positive pressure is maintained in the envelope and this is found adequate to distend it, to elevate the bearing plate 70 on the steering column 48 against the collar 51 and to hold the steering wheel 47 in conveniently disposed operating position, shown at A in FIG. 4. The operator 54 directs the vehicle from his position in the passenger compartment 52 by means of the steering wheel. At the same time, the envelope is maintained in an inflated condition similar to that of the first form so as to provide a protective cushion extending across the breadth of the vehicle. In the event of a sudden stop or crash, the operator is thrown forwardly relatively to the vehicle and, as is likely in such accident, strikes the steering wheel with his torso or head. In the present instance, however, the wheel yields to the pressure of the operator's torso and retracts into the cushion to a position B as the collar 51 forces the bearing plate 70 inwardly against the slight positive pressure of the envelope. This compresses the envelope and the impact force against the steering wheel is absorbed by the envelope as an increased flow of air is expelled from the orifice 67. Similarly, impact forces exerted on the envelope by the operator striking it are gently cushioned by expelling air from the envelope. It is to be noted that no appreciable energy is stored by the envelope and no significant bounce or rebound occurs.

During operation of the second form, the discharge of air through the orifice 67, the cushioning of the operator while dampening the impact to prevent bouncing, and reinflating the envelope to recondition if for subsequent impacts all take place substantially as described above for the first form. As a result, the vehicle operator and any passengers riding in the vehicle are protected from injury even though they are thrown forwardly into what would otherwise be a rigid dashboard or steering wheel. After the sudden stop, if the vehicle is in condition for further movement, the cushion resumes its distended condition for travel and the steering wheel is again automatically extended to the convenient operating position at A.

THIRD FORM

Figures 5, 6:
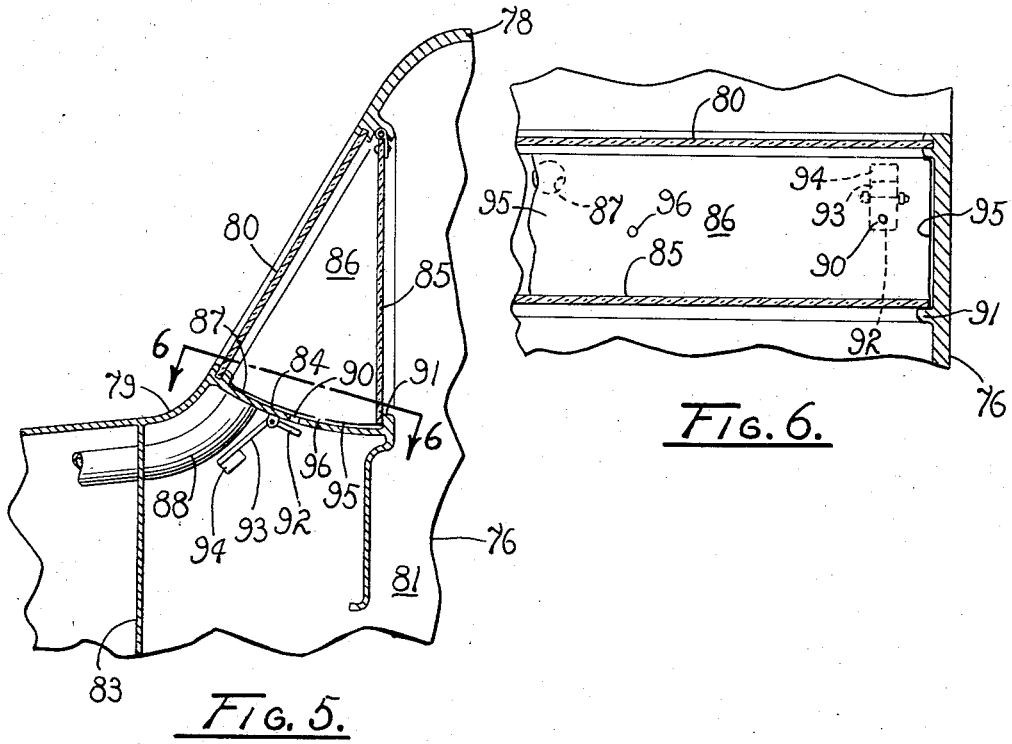
FIG. 5 is a fragmentary longitudinal vertical section of a vehicle equipped with a third form of energy absorbing cushion of the present invention.
FIG. 6 is a fragmentary transverse section of the vehicle of FIG. 5 taken in a plane represented by line 6—6 of FIG. 5.

A third form of energy absorbing cushion of the present invention is shown generally in FIGS. 5 and 6. A vehicle is fragmentarily illustrated as having a frame 76. The frame supports a top 78 and a cowl 79 between which is mounted a main windshield 80. The vehicle also has an occupant's compartment 81 having a front wall 83. The cowl extends inwardly of the compartment and provides a smooth substantially cylindrical upwardly concave surface 84. A secondary windshield 85 is preferably hingedly connected to the vehicle top interiorly of the main windshield and is disposed in substantially pneumatically sealed slidable engagement with the cylindrical surface to provide a pneumatic chamber 86 between the window members.

The extended cowl 79 provides an inlet opening 87 in which is supported an air supply conduit 88 extending through the front wall 83 to a suitable source of air under pressure, such as those described for the first form of the present invention. The extended cowl also provides a constricted outlet or orifice 90 and a shoulder 91 extending transversely and vertically of the vehicle rearwardly of the secondary windshield 85 so as to act as a stop therefor. The cowl may be extended downwardly to form an instrument panel or dashboard, if desired.

A flap 92 is preferably hingedly connected across the outlet 90 and is adapted to swing outwardly therefrom to accommodate decreased discharge of air therethrough. Attached to the flap in opposite extension from its hinged connection is a lever arm 93 having a weight 94 of selected amount connected thereto so as gravitationally to urge the flap toward the outlet. As described for the first form, the weight is preferably disposed so that upon sudden stopping of the vehicle the inertia of the weight tends to move the flap away from the outlet so as to accommodate increased air discharge therethrough. Normally, the rate of air discharge is proportionate to the rate of supply through the conduit 88.

If desired, the surface 84 and shoulder 91 can be omitted to avoid the presence in their area of hard and unyielding objects. In such event, a flexible or foldable membrane 95 is provided which interconnects the lower edges of the main windshield 80 and the secondary windshield 85. The membrane 95 provides a constricted orifice 96 which functions in the same manner as the orifice 90. When the surface 84 and edge 91 are present, the membrane need not be utilized.

OPERATION OF THIRD FORM

During travel of the vehicle on the highway, the air supply system, not shown, is activated in a manner similar to that described for the first form so as to maintain a positive pressure of a few pounds per square inch above ambient pressures within the chamber 86. As a result, the hinged windshield 85 is urged rearwardly of the vehicle into substantially pneumatically sealed engagement with the stop 91.

Upon a sudden stop or crash of the vehicle, an occupant, not shown, is thrown forwardly relative to the vehicle so as to strike a point of impact at the front of the compartment 81, such as the secondary windshield 85. The secondary windshield yields to the force of impact of the occupant, thus preventing injury such as severe bruises or lacerations to the occupant's head and body, which otherwise occur. The controlled discharge of air through the outlet 90, both before and during the accident, the dampening effect afforded by the windshield cushion to prevent bouncing the occupant's head, and the prompt reinflation to recondition the secondary windshield for subsequent impacts all take place substantially as described above for the previous forms of the present invention. Although the rigid structure of the hinged windshield member 85 does not afford the pliability described for the envelopes 13 and 62 of the first and second forms, it nevertheless yields sufficiently to minimize injuries to an occupant, which might otherwise be extremely serious as a result of violent impact with the glass windshield 80. Furthermore, the ability of the secondary windshield to yield obviously minimizes breakage and thus eliminates another cause of serious injury, namely, the presence of sharp protruding glass. It will be appreciated that when the membrane 95 is employed the envelope formed by the windshields 80 and 85 with the membrane functions in the manner described, the membrane folding to accommodate forward pivoting of the secondary windshield and the orifice accommodating continuous air exhaust from the envelope.

FOURTH FORM

Figure 7:
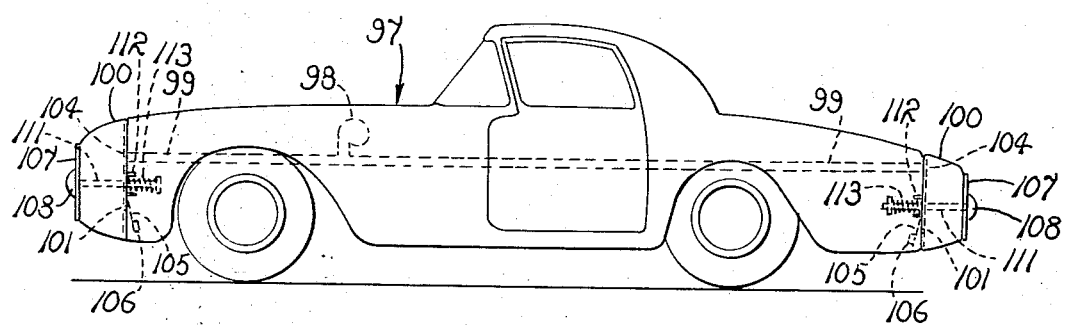
FIG. 7 is a side elevation of a vehicle equipped with a fourth form of energy absorbing cushion of the present invention.

A fourth form of the present invention is shown generally in FIG. 7 mounted on a contemporary type of passenger vehicle. The vehicle has a body 97 in which is mounted an air supply system consisting of a blower 78, such as that described for the first form, and a pair of air supply conduits 99 leading to the front and rear of the vehicle respectively. A flexible membrane or envelope 100 similar to those described above for the first and second forms is mounted at both the front and rear of the vehicle, although it may be mounted on other exterior portions of the vehicle if desired. The envelopes may be mounted on the vehicle bumpers, not shown, but for convenience of description are shown mounted directly on the vehicle body.

Each envelope 100 is provided with a constricted orifice 101 and an inlet 104 connected to the corresponding supply conduit 99. A flap 105 is preferably hingedly connected across each outlet 101 and is adapted to swing outwardly from the outlet to accommodate increased discharge of air therethrough, as described for the previous forms of the present invention. A weight 106 may be provided on the flap so as gravitationally to urge it toward the outlet and thereby to restrict or impede air discharged therethrough. A protective shield, such as a plate 107 with bumper 108, is preferably secured across the front and rear surfaces of the respective envelopes so as to prevent accidental puncture. In order to provide support for the envelopes and the increased weight of the protective shields, the shields may be supported on the vehicle body 97 by means of arms 111 extending from the vehicle body and mounted for horizontal longitudinal slidable movement in bearings 112. Compression springs 113 may be connected between the ends of the respective arms and the vehicle body to urge the shields into engagement with the body during periods of non-use.

OPERATION OF FOURTH FORM

During travel of the vehicle on a road or highway, the blower 98 is activated either manually or automatically as described above for the first form. The envelopes 100 are thereby inflated to the desired positive pressure of a few pounds per square inch above ambient pressures, while the air exhausts through the outlets 101 at a predetermined rate proportionate to the air supply rate. The exhaust rate is somewhat controlled by the gravitational bias of the flaps 105. Subsequently, if the vehicle experiences accidental impact with an object externally of the vehicle so that the object engages one or the other of the envelopes, the envelope absorbs at least a portion of the kinetic energy developed by the moving object, or if the vehicle is moving, a portion of its kinetic energy, thus effectively absorbing the energy of impact and minimizing injury to the object struck as well as to the vehicle. If the impact occurs as a result of the objects coming into contact with the vehicle while parked, the inflated envelopes function in a similar manner. In either situation, upon impact, the discharge of air through the outlet increases sufficiently to prevent bouncing of the object and otherwise functions as described above in connection with the previous forms, including prompt reinflation if necessary to recondition the envelope for subsequent impacts.

From the foregoing, it is readily apparent that an energy absorbing cushion has been provided which is adapted for use in a moving vehicle so as to absorb kinetic energy developed by objects or bodies supported therein and subjected to relative movement therebetween. It is also adapted for use on the exterior of a vehicle for cushioning impact with external objects and absorbing the energy of such impact. The cushion is usable with any type of vehicle and may absorb the kinetic energy of human passengers as well as that of livestock, cargo or the like. The cushion is deflatable for periods of non-use and inflatable prior to periods of inherent danger so as to allow economy of space during the former periods. In general, it affords substantial protection for passengers or cargoes from injury or damage by cushioning their impact as well as dampening any reflex action so as to prevent injurious bouncing after impact.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An energy absorbing cushion for the protection of an occupant of a vehicle against impacting against portions thereof incident to relative movement therebetween, as upon sudden stoppage or the like comprising a flexible pneumatic envelope supported interiorly of the vehicle at a position of potential impact and having a constricted outlet, and means connected to the envelope for supplying air to the envelope at a rate sufficient to maintain a positive pressure therein to distend the same while continuously discharging air through the outlet.

2. The cushion of claim 1 including a flap pendantly mounted in covering relation to the outlet, said flap being adapted to swing outwardly from the outlet to accommodate increased discharge of air therethrough and being gravitationally urged toward the outlet to obstruct air discharged therethrough to expedite distention of the envelope.

3. The energy absorbing cushion of claim 1, wherein the envelope is supported at the position of impact in a normally collapsed condition, and including controlled signal means associated with the air supply means for actuating said air supply means to distend the envelope upon actuation of the signal means.

4. An energy absorbing cushion for an occupant of a vehicle which has a predetermined direction of movement, said vehicle including a seat which accommodates the occupant in a traveling position, said vehicle having a safety strap associated with the seat adapted to be disposed in tension about the seat and the occupant for restraining the occupant, comprising a flexible pneumatic envelope disposed between the strap and the seat opposite to the seat from the occupant and having a constricted outlet, and means connected to the envelope for continuously supplying air to the envelope at a rate sufficient to maintain a positive pressure therein to distend the envelope while substantially continuously discharging air through the outlet.

5. The cushion of claim 4 in which the seat has a back, the envelope is disposed against the back of the seat, and the strap circumscribes the back of the seat, the envelope and the passenger.

6. The cushion of claim 4 in which the vehicle provides forward and rearward seats for occupants substantially aligned with the direction of movement of the vehicle, the forward seat having a back disposed in a position subject to impact thereagainst of an occupant of the rear seat upon sudden stopping of the vehicle, the envelope being positioned against the back of the forward seat in said position of impact, and the strap being extended about the back of the forward seat, the occupant thereof and its envelope.

7. An energy absorbing cushion for a human occupant of a vehicle having a predetermined forward direction of movement and providing a seat adapted to accommodate the occupant in traveling position in forwardly facing orientation and a solid surface disposed at a position of probable impact of the occupant thereagainst upon sudden stopping of the vehicle which is in substantially confronting relation to the seat, comprising a flexible envelope disposed in covering relation to said solid surface and having a constricted outlet, and means connected to the envelope for substantially continuously supplying air thereto at a rate sufficient to maintain a positive pressure therein to distend the same while substantially continuously discharging air through the outlet.

8. The cushion of claim 4 including a flap pendantly mounted in covering relation to the outlet, said flap being adapted to swing outwardly from the outlet to accommodate increased discharge of air therethrough and being gravitationally urged toward the outlet to obstruct air discharged therethrough to expedite distention of the envelope.

9. The cushion of claim 8 for use in a vehicle having a forward direction of movement and wherein the flap is disposed forwardly of the outlet and includes a weight gravitationally urging the flap toward the outlet, including hinge means connecting the flap to the envelope for swinging movement about an axis extending substantially transversely of the direction of movement so that upon deceleration of the vehicle the weight tends to swing the flap away from the outlet by force of inertia and thereby to open said outlet.

10. The energy absorbing cushion of claim 7 wherein the envelope is supported at the position of impact in a normally collapsed condition, and including controlled signal means associated with the air supply means for actuating said air supply means to distend the envelope upon actuation of the signal means.

References Cited

UNITED STATES PATENTS

| | | |
|---|---|---|
| 2,477,933 | 8/1949 | Labser. |
| 2,755,125 | 7/1956 | Hoges. |
| 2,781,203 | 2/1957 | Kurilenko. |
| 2,834,606 | 5/1958 | Bertrand. |
| 2,834,609 | 5/1958 | Bertrand. |
| 2,906,366 | 9/1959 | Mapes _____ 182—139 |
| 3,197,234 | 7/1965 | Bertrand. |
| 3,282,361 | 11/1966 | Mackie. |

FOREIGN PATENTS

| | | |
|---|---|---|
| 1,258,697 | 3/1961 | France. |
| 953,312 | 3/1964 | Great Britain. |
| 968,367 | 9/1964 | Great Britain. |

JAMES T. McCALL, *Primary Examiner.*